C. D. LAKE.
TABULATING MACHINE.
APPLICATION FILED AUG. 16, 1918.

1,307,740.

Patented June 24, 1919.
5 SHEETS—SHEET 1.

C. D. Lake
INVENTOR

BY
Kerr, Page, Cooper & Hayward
ATTORNEYS

C. D. LAKE.
TABULATING MACHINE.
APPLICATION FILED AUG. 16, 1918.

1,307,740.

Patented June 24, 1919.
5 SHEETS—SHEET 2.

INVENTOR
C.D. Lake
BY
Kerr, Page, Cooper & Hayward
ATTORNEYS

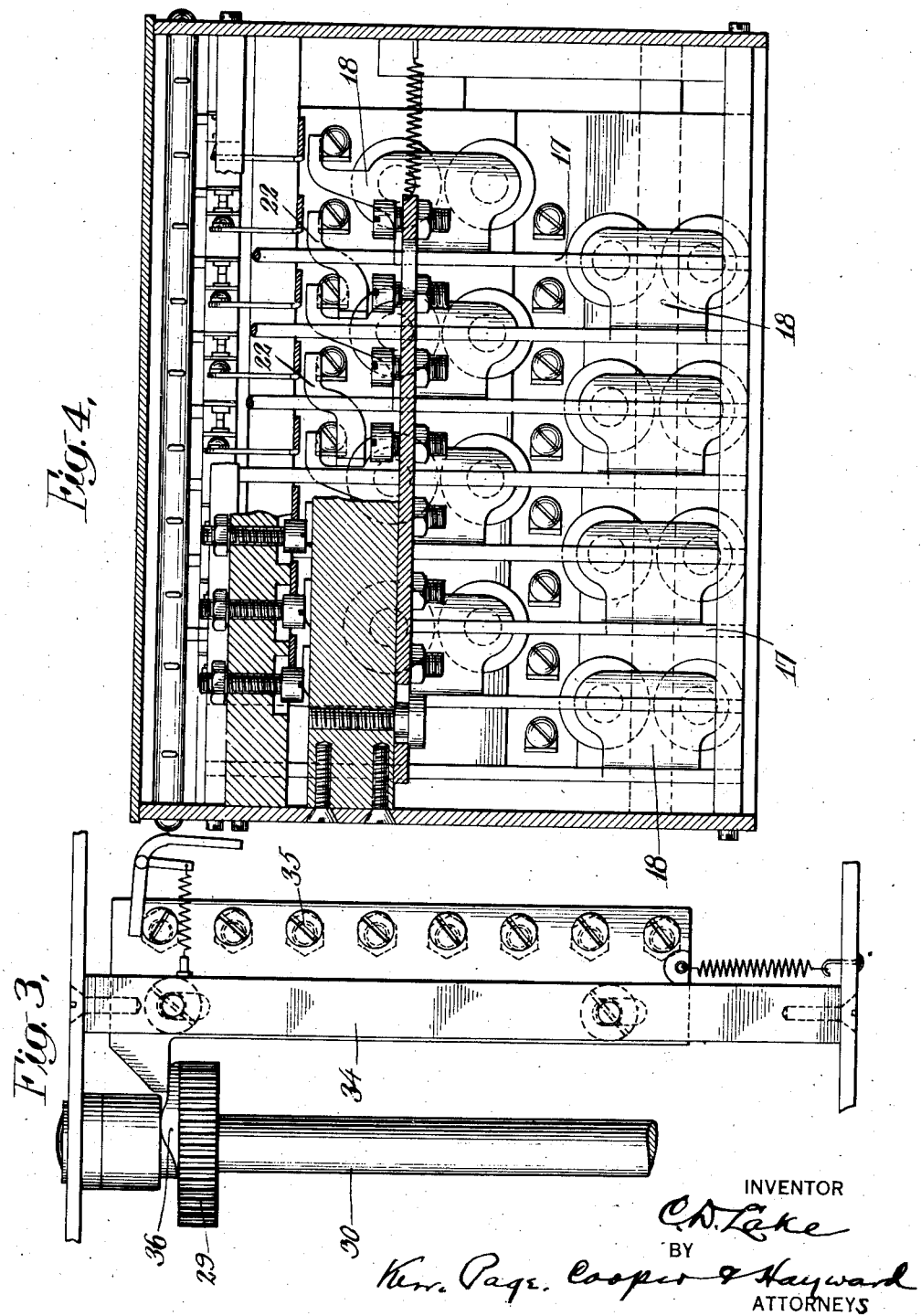

C. D. LAKE.
TABULATING MACHINE.
APPLICATION FILED AUG. 16, 1918.
1,307,740.
Patented June 24, 1919.
5 SHEETS—SHEET 4.
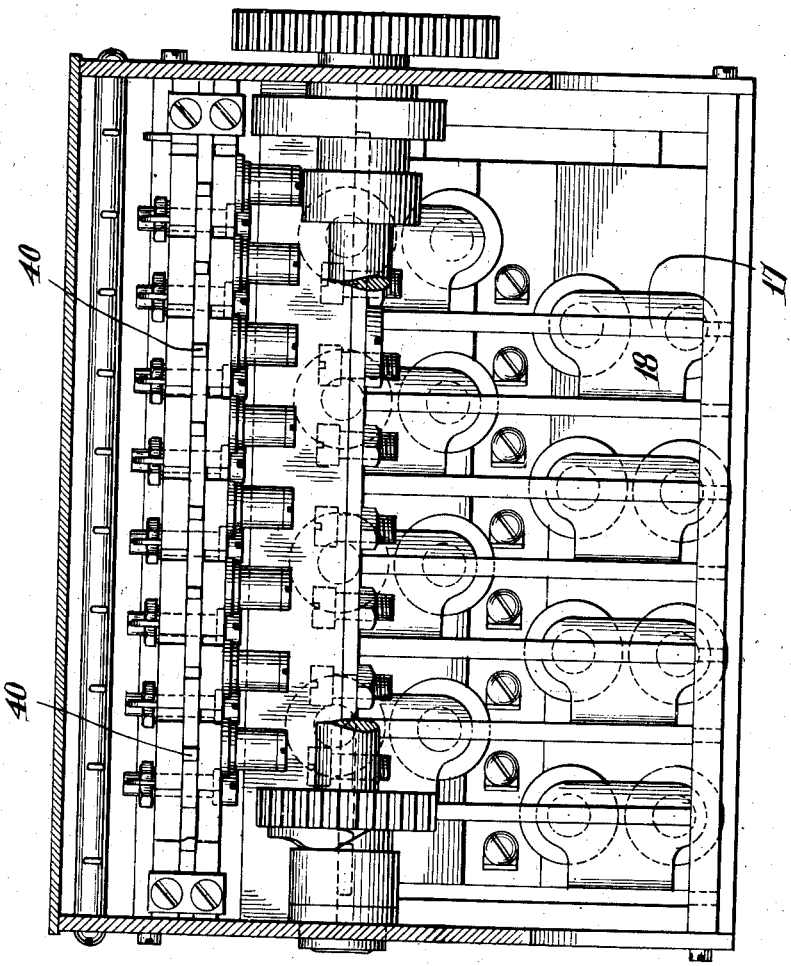
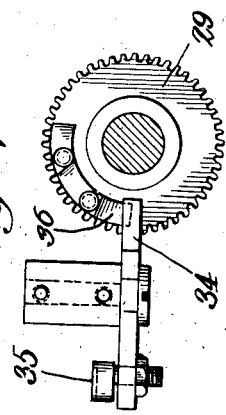
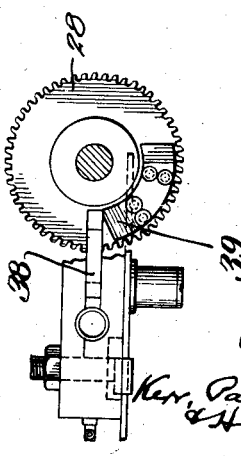
INVENTOR
C. D. Lake
BY
Kerr, Page, Cooper
& Hayward
ATTORNEYS C. D. LAKE.
TABULATING MACHINE.
APPLICATION FILED AUG. 16, 1918.
1,307,740.
Patented June 24, 1919.
5 SHEETS—SHEET 5.
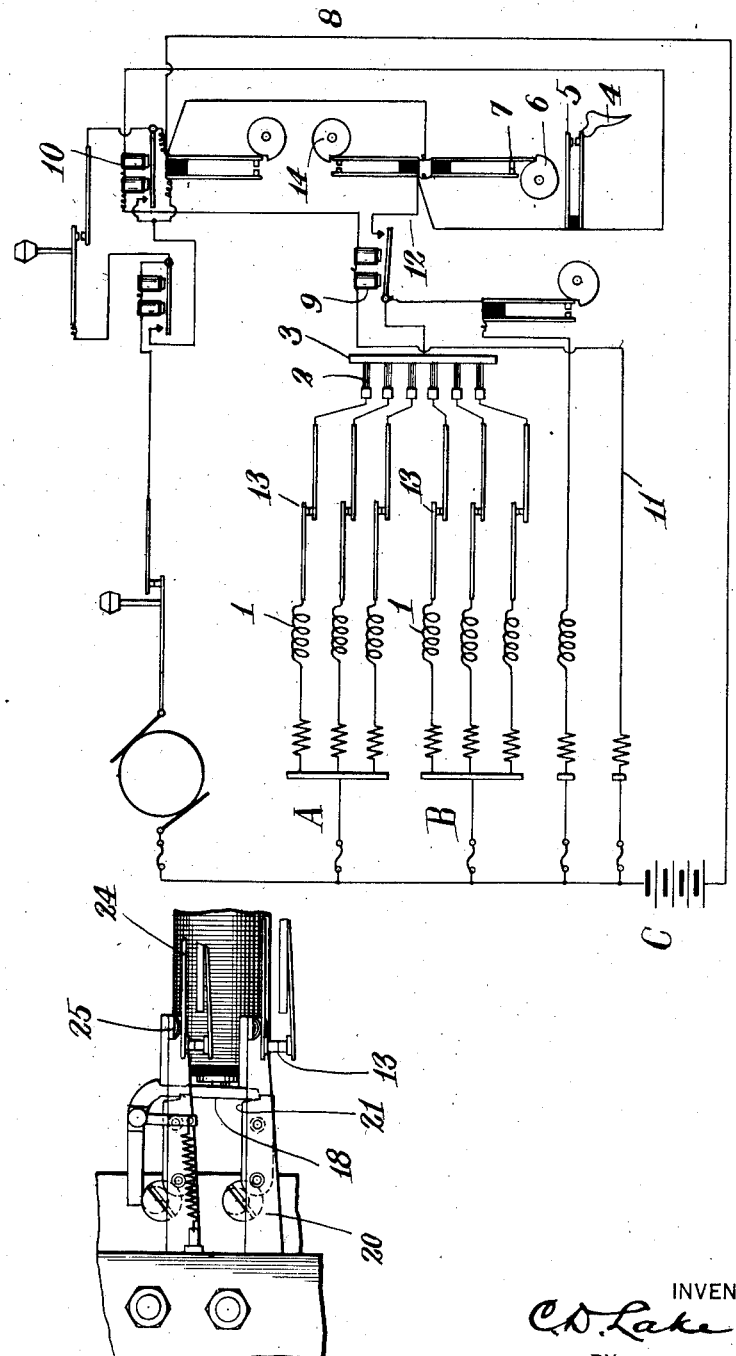
INVENTOR
C. D. Lake
BY
Kerr, Page, Cooper & Hayward
ATTORNEYS

UNITED STATES PATENT OFFICE.

CLAIR DENNISON LAKE, OF BINGHAMTON, NEW YORK.

TABULATING-MACHINE.

1,307,740.

Specification of Letters Patent. Patented June 24, 1919.

Application filed August 16, 1918. Serial No. 250,104.

*To all whom it may concern:*

Be it known that I, CLAIR D. LAKE, a citizen of the United States, residing at Binghamton, county of Broome, and State of New York, have invented certain new and useful Improvements in Tabulating-Machines, of which the following is a full, clear, and exact description.

The invention subject of this application for Letters Patent is an improvement in tabulating machines and pertains to that part of such a mechanism which is commonly known as the counter. As the system of tabulating in which the instrument is used is not free from complication, a brief reference to the nature and purpose of the apparatus used may be given in advance of a more detailed statement and description of those features which constitute this invention.

It is well known that in this art cards are punched at predetermined points to indicate the nature, value or purpose of any desired statistical data. These perforations generally speaking are in rows or horizontal lines in certain predetermined columns, and it may be assumed, for purposes of this case that one of these columns corresponds to customers who are distinguished by certain numbers corresponding to holes punched at certain points in the cards, and that another column corresponds to amounts of purchases, such amounts being similarly indicated by punched holes.

Let it be assumed that the user of the system desires at any time to ascertain from a large number of cards the total value of all the purchases of a given customer for a given time. By the use of a card sorting machine all of the cards perforated to indicate this particular customer are selected, and these are then passed through a contact mechanism which operates the counter of this application and records thereon the totals of all the amounts indicated by the punched holes in the column corresponding to sales made to that customer.

It may be that the cards indicate various other data, and that more than one counter must be operated to totalize all the items, but in such event each counter is the counterpart of the other and by the proper arrangement of circuits and other controlling and operating devices, each counter of a series will perform its allotted function without interference with any other. This is in the strictest sense, prior art, and is well understood by those skilled in such matters.

This application is concerned solely with the counter, by means of which any given set of data are tabulated or totalized, and consists in improvements in the mechanical construction of the same which render it more efficient, durable and inexpensive. These improvements may best be understood from the detailed description of the drawings which follows:

In these drawings, hereto annexed,

Fig. 3 is an enlarged detail view of the armature resetting device and cam shaft forming a part of the mechanism.

Fig. 4 is a broken section on line 4—4 of Fig. 1 and showing the other parts in end elevation.

Fig. 5 is an end view of the parts shown in Fig. 3.

Fig. 6 is a detail of the clutch lever resetting slide.

Fig. 7 is a section on line 7—7 of Fig. 1.

Fig. 8 is a detail of the latch mechanism.

Fig. 9 is a wiring diagram of the system, showing the use of a plurality of counters.

Figure 1:
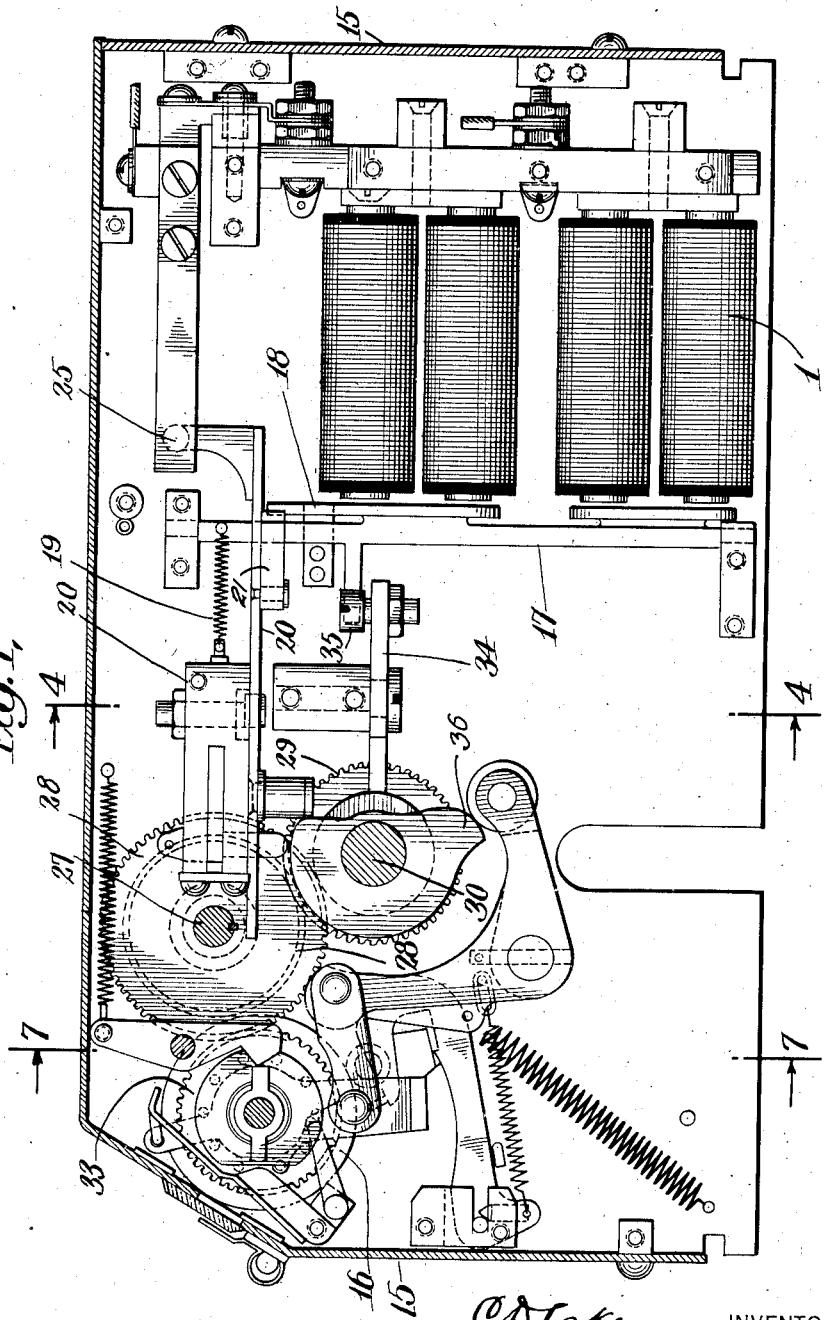
Figure 1 is a longitudinal sectional view of the counter.

Referring to Fig. 9, this diagram illustrates two counters A and B associated in a single instrument, each being shown as having three counter magnets 1, as typical of any other number, generally eight. Each of the instruments designated by the letters A and B is assumed to be such an instrument as is shown in Fig. 1 and upon which this application is based.

The perforated cards are passed between a series of brushes 2 and individual contact blocks 3 and when any card is passed into position under the brushes it is assumed to engage a lever 4 and bring together two contacts 5.

Assume that the machine is started in operation and supplied with cards which are moved in series under the brushes, then at a time when a card is just starting its movement a cam 6, operated by the machine, closes contacts 7 and thus the circuit from one terminal 8 of battery C is made through contacts 5, which are now together, the counter control relay magnet 10, the motor control relay 9, the control circuit 11, to the other battery terminal.

When any brush 2 comes over a hole punched in the card a path for the current is established from battery through its corresponding counter magnet 1, and through the circuit 12, which has been closed by the counter control relay 9; through the closed contacts 7 and to the opposite terminal of battery C.

As will be explained by reference to the counter mechanism, this circuit throws into operative condition and there locks it the means which cause the corresponding counter registering wheel to move through an arc proportional to the number represented by the position of the perforation in the card and breaks the counter magnet circuit at the contacts 13 before the brush leaves the perforation, and thus sparking at the brush is avoided. The control circuit, however, remains closed until broken by a cam 14.

This description is necessary to a full understanding of the counter mechanism, but further reference to the diagram is not required, as in all substantial respects it is illustrative of a now old and well known mechanism for use in the system which is familiar to all skilled in this art and is now in extensive use. We may pass then to a description of the new counter mechanism.

This latter is contained in a casing 15 and is shown as having eight counter magnets 1 and a suitably corresponding number of index or register wheels 16. The magnets, as shown in Figs. 4 and 7, are arranged in two horizontal rows and are staggered in position. For each magnet there is a vertical bar or rod 17 pivoted in the frame and carrying armature 18 facing the magnet poles so that on the energization of any magnet its corresponding rod 17 will be partly rotated against the force of spring 19.

Figure 2:
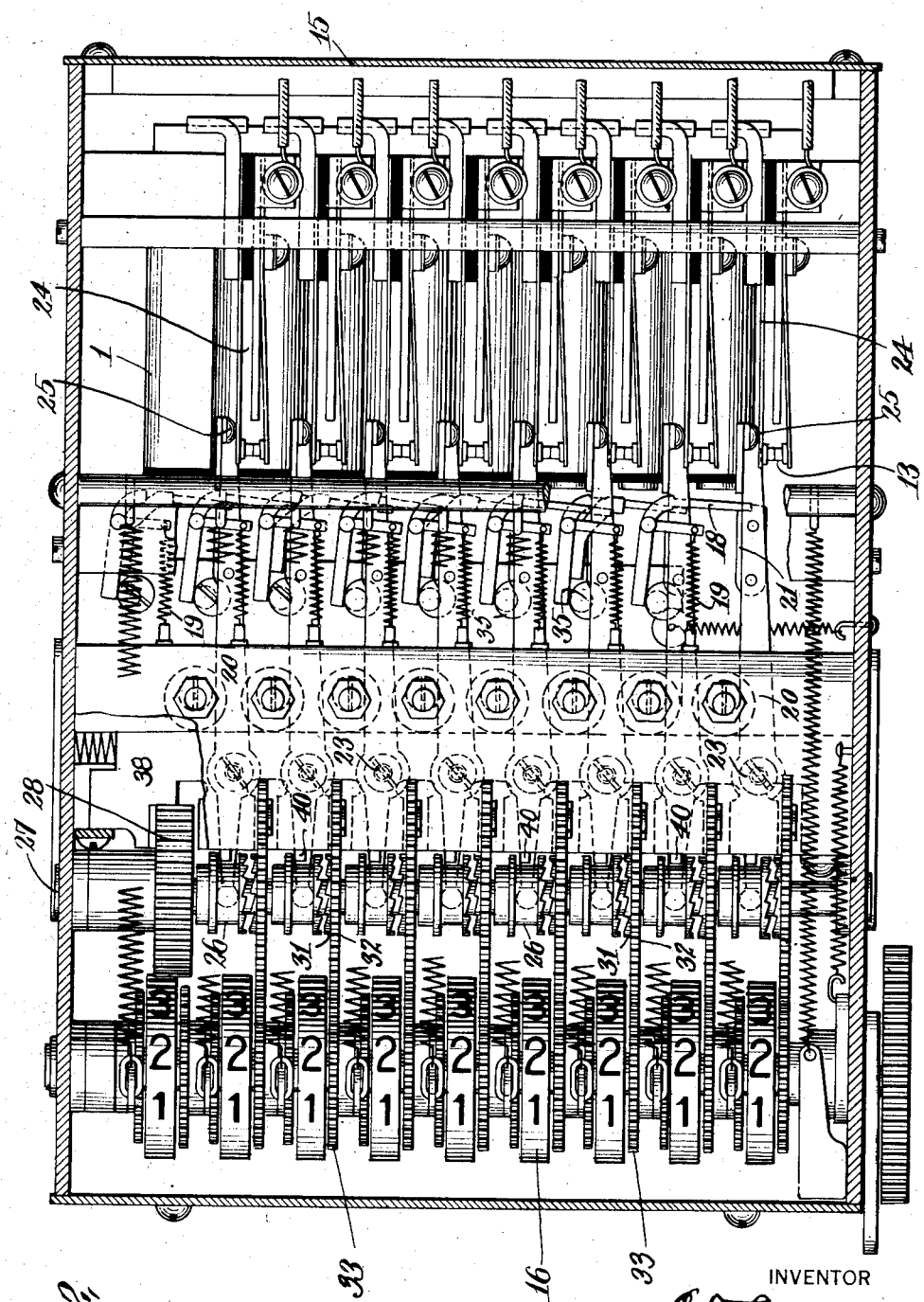
Fig. 2 is a top plan view of the same, the upper side of the casing being omitted.

This movement of the armature 18 of the upper row of magnets releases a clutch lever 20 having stops 21 which are secured to the said levers as shown in Figs. 2 and 8, with which such armatures are in direct engagement while the attractive effect of the lower magnets by turning the rods 17 accomplishes the same result by the engagement with similar stops on their levers 20 of upwardly extending projections or lugs 22, see Fig. 4, secured to the rods 17. The levers 20 while thus normally latched, are free when released in this way to be moved sidewise about their pivotal points 23 by flat springs 24 which bear upon bakelite or insulating stops 25 on said levers.

These springs 24 are insulated from the frame and constitute one of a pair of the contacts 13 in the circuit of the counter magnet 1 and when they are permitted to rise by the release of the armature 20 this part of the circuit, by the separation of contacts 13, is broken.

The levers 20 at their forward ends engage with the grooves of sliding clutches 26 mounted on and turning with shaft 27 which is driven by means of a gear wheel 28 in gear with a spur gear 29 on a driven shaft 30. These clutches at one side have teeth that are carried into engagement by the shifting of levers 20 with corresponding teeth 31 on gear wheels 32 free on the shaft 27 and in gear with wheels 33 which communicate motion to the index wheels 16.

As above stated the armatures 18 are acted upon by springs 19 which tend to restore them to normal position but I do not rely solely upon this means for the purpose, but provide a positive means for relatching them comprising a sliding plate 34 carrying adjustable stops 35, which is reciprocated by a cam 36 on one face of the gear wheel 28 on shaft 30. The stops 35 come into engagement with projections 37 on the rods 17 by the action of the cam 36 at a time during each revolution of the shaft 30 when, in the cycle of operation, the levers 20 have been thrown back to release the clutches 26.

This operation, the return of the levers 20, is effected by means of a slide 38 operated by a cam 39 on shaft 27, see Fig. 6, said slide having projections 40 which project into the clutch grooves and when shifted by means of the cam slide, said clutches are thrown back and thereby restore the levers 20 to normal position where they will be engaged and latched by the armatures 18.

The above description covers, I assume, all that is necessary to an understanding of my invention as all the remaining portions of the apparatus are well known in the prior art. As a general statement of operation, it may be said that the two shafts 27 and 30 make one revolution for each cycle or revolution of the tabulator or index wheel of the card manipulating device. The instant in each cycle therefore, that a perforation indicating a given number comes under a brush, will determine the point in the revolution of the clutch when it is thrown into gear with its indicating character wheel, and this will determine the number of steps or spaces that that wheel will be turned corresponding to such number. The driving, the carrying and other mechanism embodied in the device are all well known features of the prior art.

Formerly in the apparatus on which this device is an improvement, there was employed in the circuit of each brush a relay, which on the passage of the brush over a perforation in a card was energized along with the counter magnet and remained active after the brush had passed the perforation, being held so by a shunt circuit under its own control which kept also the counter magnet energized, for the purpose of holding the clutch in operative position during the adding on the counter. The circuit was then broken by the standard break cam in the brush circuit. This prevents any arcing at the brush when it leaves a perforation, but it involves a much more complicated and expensive mechanism than that which I have now devised and set forth above.

Again, it has been found that spring action in a rapidly operating machine cannot be depended upon to restore the parts after operation, and this I have overcome by the positive action of the restoring means herein described. In these features, therefore, my present invention will be seen to chiefly reside, and it is these which I now seek to protect by the claims of this application.

What I claim is:—

1. In a tabulating apparatus the combination with control wheels and magnets adapted to be included in a part of circuits established by brushes passing over perforations in a card, of means controlled by said magnets for turning the said counter wheels through arcs corresponding to the position of the perforations in the card, means for locking the said controlled means in the positions to which it is brought by the action of the magnets, circuit controllers in that portion of the active circuit which includes the counter magnets, operated by the movement of the controlled means before the brushes leave the perforations, and means controlled by the counter mechanism for restoring the parts to normal condition at the end of each cycle of operation.

2. In a tabulating apparatus the combination with counter wheels and, magnets adapted to be included in a part of circuits established by brushes passing over perforations in a card, of clutches set by the action of said magnets to impart movement to the counter wheels corresponding to the position of the perforations in the card, circuit controllers in that part of the circuit which includes the counter magnets adapted to be operated simultaneously with the setting and by the movement of the clutches, and means controlled by the counter mechanism for restoring to normal position all parts of the apparatus at the end of each cycle of operation.

3. In a tabulating apparatus the combination with counter wheels and magnets adapted to be included in a part of circuits established by brushes passing over perforations in a card, and when energized to control the operation of a counter, of circuit breakers operated at the time of energization of said magnets by parts moved by the same to interrupt the portion of the circuit including the magnets before the brushes pass a perforation whereby arcing at the brushes is avoided.

4. In a tabulating machine the combination with counter wheels and magnets adapted to be included in a part of circuits established by the passage of brushes over perforations in a card, of means controlling the actuation of said wheels corresponding to the magnet so energized, circuit controllers acting upon and adapted to bring said means into operation, armatures normally locking or latching said means but adapted to release the same when attracted by their respective magnets whereby the said means are operated by the circuit controllers and the latter by their resultant movement break the operation of the circuit including their corresponding counter magnet.

5. In a counter of the kind described, the combination with counter wheels, electromagnets for operating the same, and spring actuated clutch levers intermediate the said wheels and magnets for controlling the operation of said wheels, of spring actuated latching armatures for the clutch levers, and means actuated by the power driven counter mechanism for positively engaging with the clutch levers and the latching armatures after their release and returning the same to normal or latched condition after each cycle of operation of the apparatus.

6. In a system of the kind described the combination with counter wheels and magnets of a counter control circuit adapted to be mechanically established at the beginning of each cycle of operation of the counter, of brushes adapted to pass over a perforated card and when passing a perforation to close a circuit parallel to the control circuit which includes a counter magnet, and circuit controllers in said magnet circuits operated upon energization of the magnets by the parts moved thereby to break the said circuits before the brush leaves the perforation, whereby arcing at the brush is avoided.

7. In a counter of the kind described, the combination with the counter wheels of corresponding electro-magnets and intermediate clutch levers under the control of the magnets for effecting the proper movements of the counter wheels, armatures for said magnets normally latching said clutch levers out of operation, spring actuating means for moving said clutch levers and retracting said armatures and positively driven devices for engaging with said levers and armatures after they have been moved and restoring the same to normal position at the end of each cycle of operation of the counter mechanism.

8. In a counter of the kind described, the combination with counter wheels and corresponding electro-magnets controlling their operations, of clutch levers intermediate, the wheels and magnets, insulated springs bearing upon said clutch levers, armatures normally latching the clutch levers in inoperative position, and contact springs bearing on the clutch actuating springs and adapted to break the circuit of the magnets when by the attraction of an armature its corresponding clutch lever is released and moved by the spring bearing thereon.

In testimony whereof I hereunto affix my signature.

CLAIR DENNISON LAKE.